United States Patent [19]

Saitou et al.

[11] 4,428,009
[45] Jan. 24, 1984

[54] SUPERMINIATURE TAPE RECORDER

[75] Inventors: Shinichi Saitou; Masatoshi Ida, both of Hachioji, Japan

[73] Assignee: Olympus Optical Company Limited, Tokyo, Japan

[21] Appl. No.: 365,888

[22] Filed: Apr. 6, 1982

Related U.S. Application Data

[63] Continuation of Ser. No. 154,538, May 30, 1980, which is a continuation of Ser. No. 926,208, Jul. 19, 1978, abandoned.

[30] Foreign Application Priority Data

Jul. 20, 1977 [JP] Japan .................................. 52-87529

[51] Int. Cl.³ .......................... G11B 5/45; G11B 15/46
[52] U.S. Cl. .......................................... 360/65; 360/73
[58] Field of Search ...................... 360/65, 66, 67, 68, 360/73

[56] References Cited

U.S. PATENT DOCUMENTS 3,465,321 9/1969 Reisfeld ................................. 360/67
3,588,380 6/1971 Horlander et al. .................... 360/66
3,798,673 3/1974 Koinuma et al. ..................... 360/66
4,038,692 7/1977 Umeda et al. ......................... 360/65

FOREIGN PATENT DOCUMENTS 913683 12/1962 United Kingdom ................. 360/65

Primary Examiner—Vincent P. Canney
Attorney, Agent, or Firm—Toren, McGeady and Stanger

[57] ABSTRACT

The disclosed recorder includes a motor, a magnetic head, an oscillation circuit connected to the head, an equalizing circuit connected to the oscillation circuit. The equalizing circuit includes a capacitor which, when grounded, changes the equalization of the equalizing circuit. A signal amplifier is connected to the equalizing circuit. A speed changing circuit is connected to the motor for changing the speed of the motor and, hence, the tape speed, and a switch forms an operating path when closed for simultaneously connecting the speed changing circuit to ground through the path so as to energize the speed changing circuit and connects the capacitor to ground through the same path so as simultaneously to change equalization of the equalizing circuit.

7 Claims, 8 Drawing Figures

FIG_3
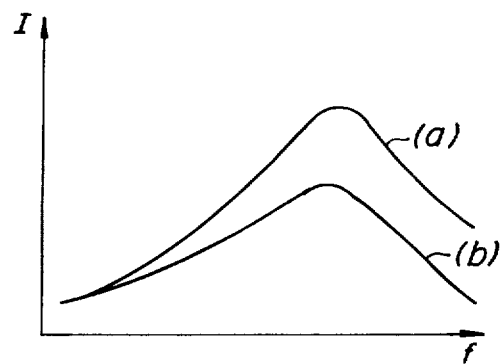
FIG_4a
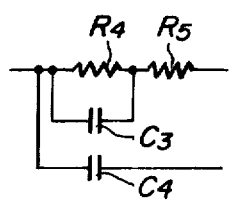
FIG_4b
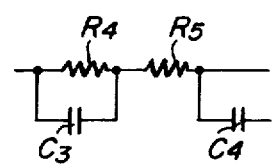
FIG_4c
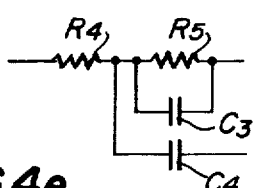
FIG_4d
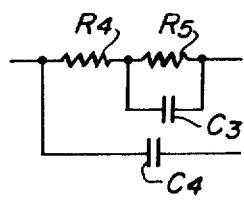
FIG_4e
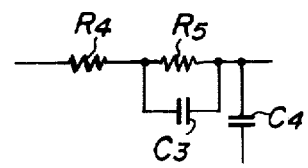

SUPERMINIATURE TAPE RECORDER

This is a continuation of application Ser. No. 154,538 filed May 30, 1980, which is a continuation of application Ser. No. 926,208 filed July 19, 1978, now abandoned.

BACKGROUND OF THE INVENTION

1. Field of the Invention

The present invention relates to a tape recorder which can switch a tape speed.

2. Description of the Prior Art

Tape recorders of this type generally include a recording circuit of the type shown in FIG. 1. Here, an oscillation block OSCB is connected to a magnetic head HD. This oscillation block OSCB has one end of a primary winding of an oscillation transformer T connected to a base of a transistor Tr through a resistance $R_1$ and the other end connected to a collector of the same transistor Tr. This transistor Tr has a grounded emitter. A capacitor $C_1$ is connected between both terminals of the secondary winding of the oscillation transformer T. One end of the parallel combination of the secondary winding and the capacitance $C_1$ is connected to the head HD and the other end thereof is connected to the emitter of the transistor Tr through a capacitor $C_2$.

The center tap of the primary winding of the oscillation transformer T connects to a power supply source (not shown) through a bias resistance BR. The bias resistance BR is composed of resistances $R_2$ and $R_3$, so that when a tape speed is 1.2 cm/sec, the resistance $R_2$ is only connected in parallel, and when the tape speed is 2.4 cm/sec, the resistance $R_3$ is connected in parallel, respectively, so as to generate a higher AC bias from the oscillation block OSCB. The switching of the resistances $R_2$ and $R_3$ in this case is carried out by a switch SW interlocked with speed switching of the motor (not shown).

The oscillation block OSCB receives the output of a final stage amplifier AMP through an equalizing circuit EQ. The equalizing circuit EQ is formed by connecting the resistance $R_5$ in series with a parallel combination of the resistance $R_4$ and the capacitor $C_3$ and set at a given time constant.

According to this construction, the optimum AC bias in response to the tape speed can be obtained, and under this state, the recording output of the amplifier is applied to the head HD through the equalizing circuit EQ to record the tape.

With such a construction, however, because the time constant of the equalizing circuit EQ is the same when the tape speed is 1.2 cm/sec and 2.4 cm/sec, the frequency characteristics become different. In particular, at 2.4 cm/sec, the frequency characteristic is extended to a higher range to produce a strain in high tones, and as a result, as compared with the case of 1.2 cm/sec, tone quality becomes considerably different.

SUMMARY OF THE INVENTION

An object of the present invention is to eliminate the above described defects of the conventional tape recorder.

Another object of the present invention is to provide a tape recorder which can make the tone quality uniform by switching the characteristic of the equalizing circuit in response to the tape speed and can prevent enlargement of the switch by utilizing the above switching with the use of the speed changing switch of the motor.

According to the present invention a tape recorder having a tape speed changing mechanism comprises a magnetic head, an oscillation circuit connected to the head, an equalizing circuit connected to the oscillation circuit, said equalizing circuit having a capacitor for bypassing a higher frequency component to ground the equalizing circuit therethrough, and a signal amplifier circuit connected to the equalizing circuit. The tape recorder also comprises a speed changing switch for a tape driving motor to earth the capacitor through thd switch.

BRIEF DESCRIPTION OF THE DRAWING

FIG. 3 is an equalizing characteristic for explaining the above recording circuit of the invention; and FIGS. 4a to 4e are circuit diagrams showing modified embodiments of the equalizing circuit used in the same recording circuit.

DESCRIPTION OF THE PREFERRED EMBODIMENT

Figure 1:
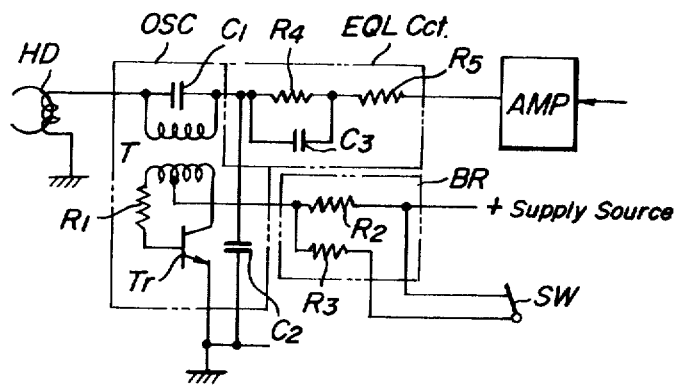
FIG. 1 is a circuit diagram showing one embodiment of a recording circuit of a conventional tape recorder.
Figure 2:
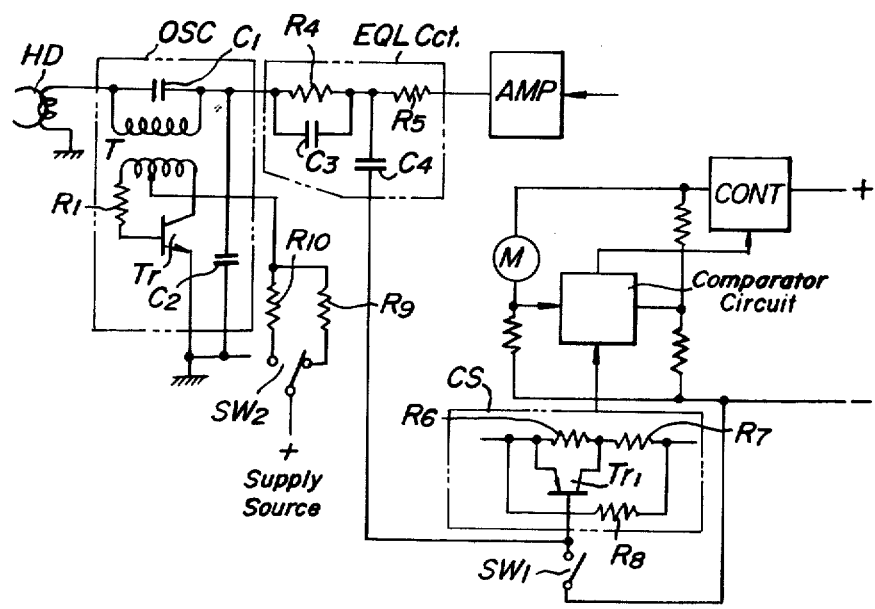
FIG. 2 is a circuit diagram showing one embodiment of a recording circuit according to the present invention.

Referring now to FIG. 2 one embodiment of a tape recorder according to the present invention is described. In FIG. 2 like parts are designated by the same numerals as in FIG. 1. In FIG. 2 the speed of a motor M is controlled by a control circuit CONT in accordance with the output of a comparison circuit COMP for comparing the reference voltage of a reference circuit CS and the output of the motor M. In this case, the reference circuit CS is formed by connecting a resistance $R_8$ in parallel to a series circuit of the resistances $R_6$ and $R_7$, a transistor $Tr_1$ between both terminals of the resistance $R_6$ and grounding the base of the transistor $Tr_1$ through a switch SW1. Now when the tape speed is 1.2 cm/sec, the reference voltage determined by the resistances $R_6$, $R_7$, $R_8$ is generated, while when the tape speed is 2.4 cm/sec, the switch SW1 is closed, to turn the transistor $Tr_1$ ON and to short-circuit the resistance $R_6$, and thus the reference voltage determined by the resistances $R_7$, $R_8$ is generated.

Between the connection point of the resistances $R_4$ and $R_5$ of the equalizing circuit EQ and the base of the transisor $Tr_1$ is connected a capacitor $C_4$. The capacitor $C_4$ is inserted into the equalizing circuit EQ after the switch SW1 is closed when the tape speed is 2.4 cm/sec and a constant is varied, so that the only higher frequency component in the recording output of the amplifier AMP is only bypassed.

Accordingly, the equalizing characteristic in this case exhibits a slow curve b in FIG. 3 as compared with the case of the tape speed 1.2 cm/sec shown by curve a in FIG. 3.

Between a center tap of a primary winding of an oscillation transformer T of an oscillation block OSCB and power supply source (not shown) are selectively inserted resistances $R_9$, $R_{10}$ through a switch SW2. In this case, the value of the resistance $R_9$ is set higher than that of the resistance $R_{10}$. The switch SW2 is interlocked with the switch SW1, so that when the tape speed is 1.2 cm/sec, the resistance $R_9$ is connected, and when the tape speed is 2.4 cm/sec, the resistance $R_{10}$ is connected, respectively, so as to generate the optimum AC bias in accordance with each tape speed from the oscillation block OSCB.

In operation, when the switch SW1 is opened as illustrated, the reference circuit CS generates a reference voltage determined by the resistances $R_6$, $R_7$, $R_8$ because making the transistor $Tr_1$ off. Thus the motor M is controlled to a speed corresponding to the tape speed of 1.2 cm/sec. In this case, the capacitor $C_4$ is cut off, so that the output of the amplifier AMP is given to the head HD through the equalizing circuit EQ having the characteristic shown in FIG. 3 curve A and recording is carried out. The switch SW2 is interlocked with the switch SW1 and connected to the resistance $R_9$ to provide the optimum AC bias for the tape speed of 1.2 cm/sec.

Next, when the switch SW1 is closed, the transistor $Tr_1$ is turned on and the reference circuit CS generates a reference voltage determined by the resistances $R_7$, $R_8$. Hence the motor M is controlled to a speed corresponding to the tape speed of 2.4 cm/sec. In this case the capacitor $C_4$ is connected to the equalizing circuit EQ so that the output of the amplifier AMP is given to the head HD through the equalizing circuit EQ having the characteristic shown in FIG. 3 curve b. Therefore, only the higher frequency component in the output of the amplifier AMP is bypassed by the capacitor $C_4$, so that the extreme rise of the higher zone is checked and the tone quality becomes almost equal to the time when the tape speed is 1.2 cm/sec.

In this case, the switch SW2 is interlocked with the switch SW1 and switched to the resistance $R_{10}$, so that the AC bias suitable for the tape speed of 2.4 cm/sec is given.

According to this construction, the optimum equalizing characteristic in response to the tape speed can be obtained, particularly, the extreme rise of the higher range when the tape speed is 2.4 cm/sec can be prevented. Thus the tone quality can be equalized without any influence upon the tape speed. The switching of the equalizing characteristic can be made with the aid of the speed changing switch of the motor so that even when this special function is added, it is not necessary to make the switch. This is very important for the kind of tape recorder whose size must be minimized.

The present invention is not limited to the above embodiment but can be modified without departing from the scope of the invention. For example, connection of the equalizing circuit EQ to the capacitor $C_3$ can be changed as shown in FIGS. 4a to 4e.

As described above, according to the invention, the characteristic of the equalizing circuit can be switched in accordance with the tape speed so as to equalize the tone quality. In addition, the switching is carried out with the aid of the speed changing switch of the motor to prevent enlargement of the switch.

What is claimed is:

1. A tape recorder having a tape speed changing mechanism comprising a motor, a magnetic head, an oscillation circuit connected to the head, an equalizing circuit connected to the oscillation circuit, said equalizing circuit having a capacitor for bypassing a high frequency component to ground, a signal amplifier circuit connected to the equalizing circuit, a speed changing circuit connected to the motor for changing the speed of the motor, and a switch connected to ground for energizing the speed changing circuit through a conductive current path in the switch, said capacitor being groundable through the same conductive current path in the switch.

2. A recorder as in claims 1 or 4, wherein the switch is a single pole single throw switch connected to the speed changing circuit and the capacitor.

3. A recorder as in claim 2, wherein said switch is connected in series with the capacitor.

4. A variable-speed tape recorder, comprising:
   a motor,
   a magnetic head,
   an oscillation circuit connected to the head,
   an equalizing circuit connected to the oscillation circuit,
   said equalizing circuit having a capacitor which when unconnected causes said equalizing circuit to exhibit a given equalization and when connected to a point causes change in the equalization of the equalizing circuit,
   a signal amplifier connected to the equalizing circuit,
   a speed changing circuit connected to the motor for changing the speed of the motor, and
   a switch connected to said capacitor and said speed changing circuit for forming an operating current path when closed and for simultaneously connecting said speed changing circuit to the given point through the current path so as to energize the speed changing circuit and connecting the capacitor to the point through the same current path so as simultaneously to change equalization of the equalizing circuit.

5. A variable speed tape recorder, comprising:
   a motor,
   a magnetic head,
   an oscillation circuit connected to said head,
   an equalizing circuit,
   an amplifier,
   said equalizing circuit including a first terminal connected to said oscillation circuit and a second terminal connected to said amplifier as well as a control terminal,
   said equalizing circuit having a capacitor therein connected to said control terminal,
   a point of predetermined potential,
   said equalizing circuit when said control terminal is connected to said point causing said equalizing circuit to exhibit a given equalization and when disconnected from the point causing the equalizing circuit to exhibit a second equalization,
   a speed changing circuit connected to the motor for changing the speed of the motor,
   a switch having a first end connected to said control terminal and to said speed changing circuit and a second end connected to said point of predetermined potential for forming an operating current path when closed and for simultaneously connecting the speed changing circuit to the point through the operating current path so as to energize the speed changing circuit and connecting the control terminal to the point through the same current path so as simultaneously to change equalization of the equalizing circuit.

6. A tape recorder as in claim 5, wherein said speed changing circuit includes a semi-conductor device having a control electrode, said control electrode being connected to said one end of said switch.

7. A tape recorder as in claim 6, wherein said point is at ground potential.

* * * * *